US006819263B1

(12) United States Patent
Kelly

(10) Patent No.: US 6,819,263 B1
(45) Date of Patent: Nov. 16, 2004

(54) VEHICLE SPEED VERIFICATION DEVICE

(76) Inventor: Ivan Lidell Kelly, 1312 Cross Hill Rd., Hopkins, SC (US) 29061

( * ) Notice: Subject to any disclaimer, the term of this patent is extended or adjusted under 35 U.S.C. 154(b) by 0 days.

(21) Appl. No.: 10/626,806

(22) Filed: Jul. 25, 2003

(51) Int. Cl.$^7$ ................................................ G08G 1/01
(52) U.S. Cl. .................... 340/936; 340/441; 340/425.5; 342/20; 702/143
(58) Field of Search ............................. 340/936, 425.5, 340/438, 441; 342/13, 20, 104; 702/142, 143

(56) References Cited

U.S. PATENT DOCUMENTS

| | | | |
|---|---|---|---|
| 5,134,406 A | * | 7/1992 | Orr .............................. 342/20 |
| D355,616 S | * | 2/1995 | Gregg, III et al. |
| 5,510,793 A | * | 4/1996 | Gregg, III et al. .......... 340/936 |
| 5,815,092 A | * | 9/1998 | Gregg, III et al. .......... 340/936 |
| 5,819,198 A | * | 10/1998 | Peretz ......................... 701/117 |
| 5,977,884 A | * | 11/1999 | Ross ........................... 340/936 |

* cited by examiner

*Primary Examiner*—Donnie L. Crosland

(57) ABSTRACT

A vehicle speed verification device includes a housing including a display screen for illustration a vehicle speedometer. The housing is electrically connected to a vehicle transmission and a vehicle speedometer. The display screen preferably includes a LED meter and a speedometer needle cooperating with the LED meter for indicating a vehicle speed. The device further includes a system for detecting when a speed-measuring device locks onto a vehicle and another system for concurrently determining a vehicle speed and displaying same when the detecting system sends a signal to the determining system. The detecting system may include a laser and a radar detector. The device may further include a system for printing the speed of a vehicle. Such a system is connected to a central processing unit and preferably includes a data system for printing time, date, month and year of speed verification.

15 Claims, 3 Drawing Sheets

VEHICLE SPEED VERIFICATION DEVICE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to speed verification devices and, more particularly, to a vehicle speed verification device including means for verifying vehicle speed when a police laser or radar signal locks onto the vehicle.

2. Prior Art

Often, motorists receive speeding tickets that are not deserved. Three main reasons why speeding tickets are not deserved include (1) improper calibration of police radar equipment, (2) operation of police radar equipment by inexperienced police personnel, and (3) improper target identification. In this latter category, it is well known that the strength of a signal being employed by police personnel to measure vehicle speed, when that signal is sensed at the police vehicle, is inversely proportional to the fourth power of the distance ($D^4$) between the police vehicle and the intended target. This is because the strength of the signal decreases proportional to $D^2$ from the police vehicle to the target and again proportional to $D^2$ from the target back to the vehicle.

Furthermore, as is also known, the strength of the reflected signal is proportional to the surface area of the target. Thus, for example, the surface area of the front of the cab of an 18-wheel truck may be five times as large as the surface area of the front of an ordinary car. Thus, if such a car and truck are traveling side-by-side, the reflected signal from the truck will be five times as strong as that of the car. Therefore, it should be understandable that when such a truck is following a car, it is quite possible that a speed-measuring device will measure the speed of the truck even though the car is closer to the police vehicle.

Accordingly, it often occurs that police radar measures a larger vehicle further away from the police radar than the smaller vehicle which is eventually stopped and whose owner is subsequently charged with a speeding offense. It is with these aspects in mind that the present invention was developed.

BRIEF SUMMARY OF THE INVENTION

In view of the foregoing background, it is therefore an object of the present invention to provide a device that can concurrently verify the speed of a vehicle when a police laser or radar locks onto the vehicle. These and other objects, features, and advantages of the invention are provided by a vehicle speed verification device including a housing including a display screen for illustrating a vehicle speed. The housing is electrically connected to a vehicle transmission and a vehicle speedometer. The display screen preferably includes a LED meter and a speedometer needle cooperating with the LED meter for indicating a vehicle speed. Also, the display screen may include an LCD display.

The device further includes a power supply source connected to the housing and for selectively supplying power thereto. The device further includes a system for detecting when a speed-measuring device locks onto a vehicle and another system for concurrently determining a vehicle speed and displaying same when the detecting system sends a signal to the determining system. The detecting system may include a laser and a radar detector.

The determining system preferably includes a central processing unit and a memory unit connected thereto. The central processing unit sends signals to the memory unit for storing a vehicle speed thereat. The device may further include a system for printing the speed of a vehicle. Such a system is connected to the central processing unit and preferably includes a data system for printing time, date, month and year of speed verification.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiments set forth herein. Rather, this embodiment is provided so that this application will be thorough and complete, and will fully convey the true scope of the invention to those skilled in the art.

Figure 1:
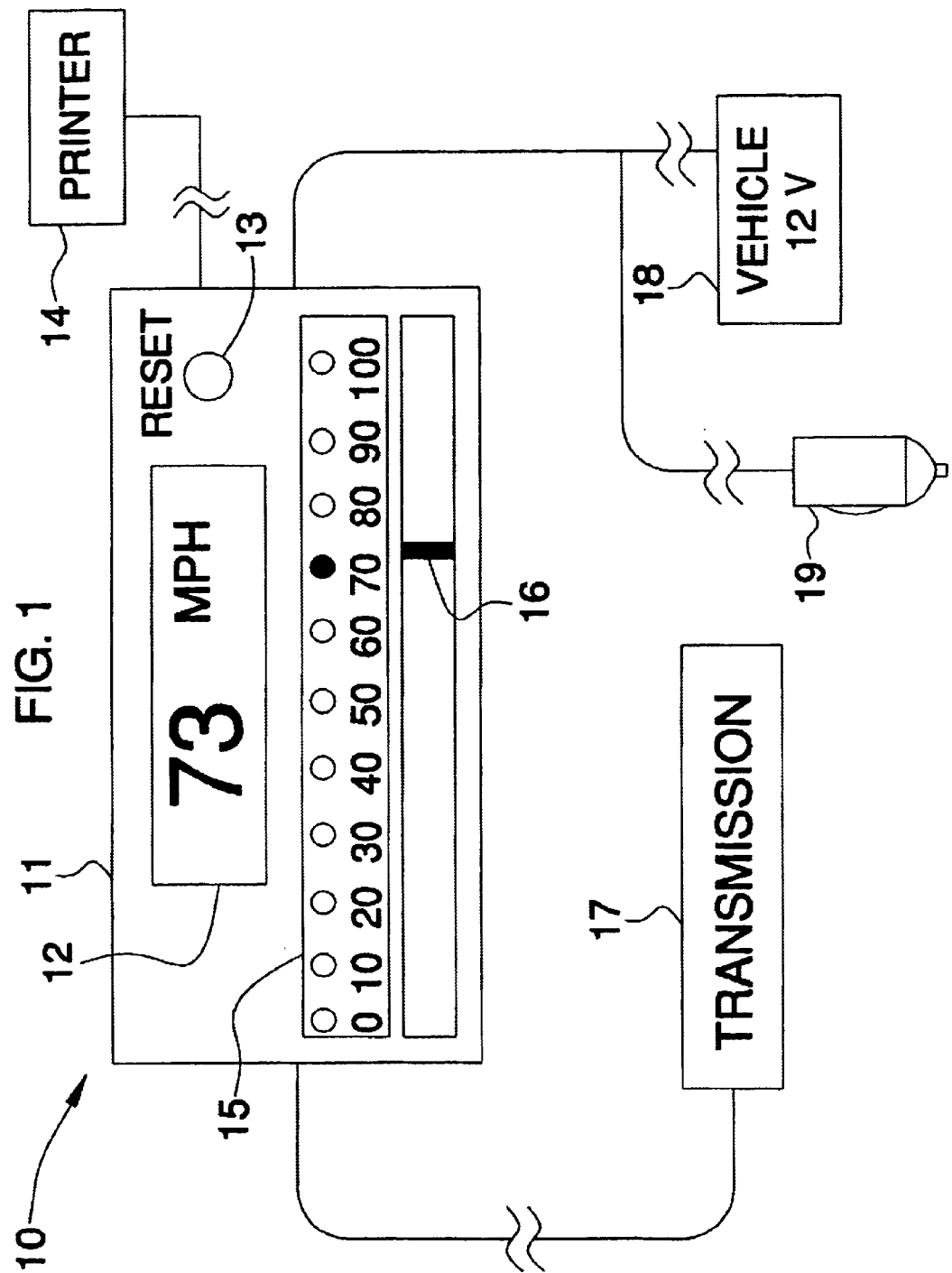
FIG. 1 is a schematic diagram of a vehicle speed verification device, in accordance with the present invention.

The device of this invention is referred to generally in FIG. 1 by the reference numeral 10 and is intended to concurrently verify the speed of a vehicle when a police laser or radar locks onto the vehicle. It should be understood that the device 10 may be used to verify the speed of various vehicles and should not be limited to only conventional vehicles.

The device 10 includes a housing 11 removably mountable within a vehicle. Such a housing 11 includes a LCD display 12 for indicating the speed of the vehicle. A LED meter 15 also lights up according to the speed of the vehicle and a speedometer needle 16 selectively moves along the LED meter 15 to indicate the detected vehicle speed, as clearly shown. A reset button 13 allows an operator to cancel or zero-out the verified speed, as desired. The device 10 is connected to the transmission of a vehicle 17 and also to the speedometer 24 of a vehicle.

Power supply source 18 is electrically connected to the housing 11 and may also be electrically connected to a lighter adapter 19 for supplying power to the device 10. The Power supply source 18 may be hardwired to the device 10, in a manner well-known in the industry. The printer 14 is connected to the device 10 for printing the speed of the vehicle at a predetermined time and may also print the date and time of the vehicle reading.

Figure 2:
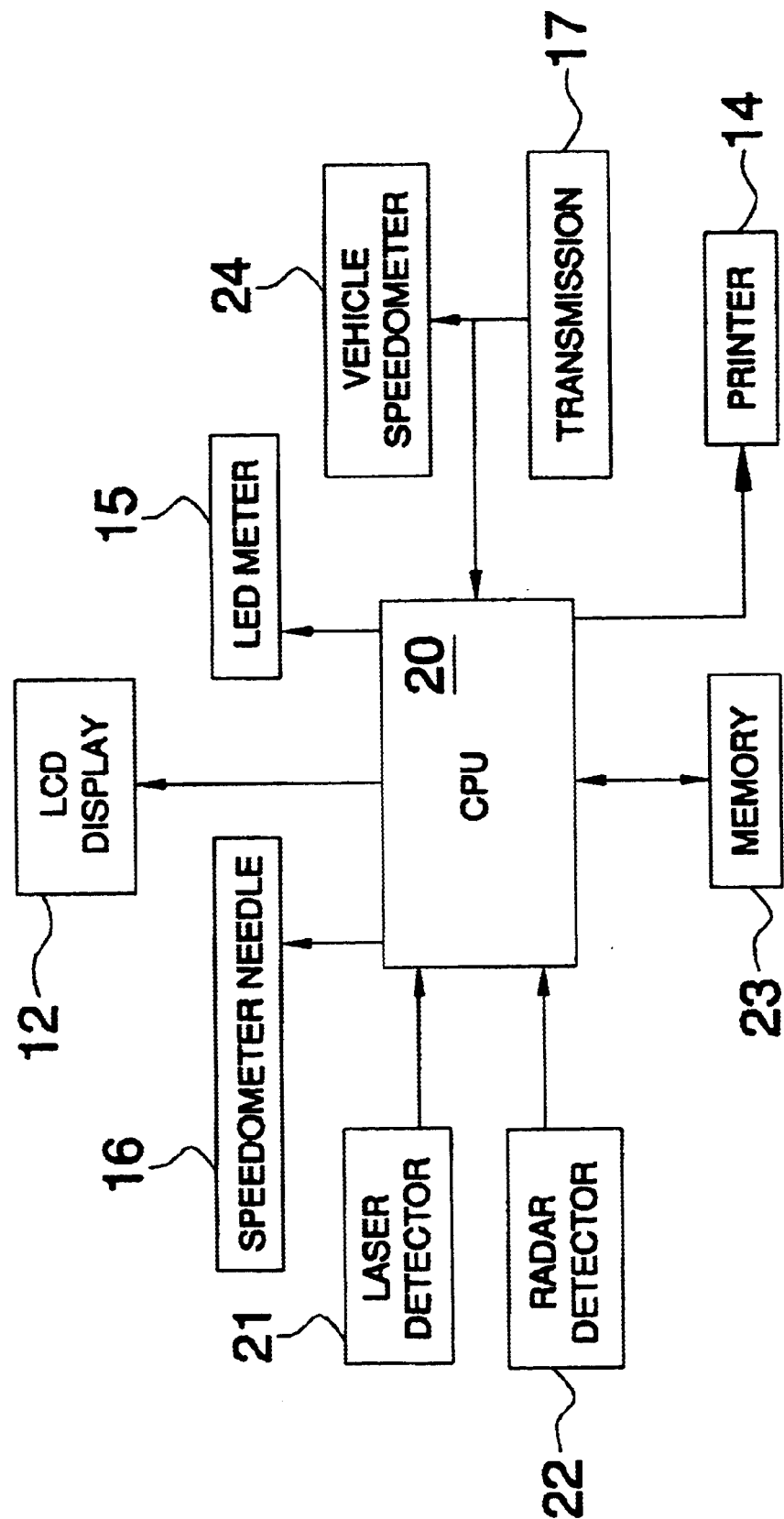
FIG. 2 is a schematic diagram showing the combination of elements comprising the present invention.

Now referring to FIG. 2, a central processing unit 20 is connected to the LCD display 12 and sends signals thereto for indicating the speed of a vehicle. The central processing unit 20 also sends signals to the LED meter 15 for indicating a vehicle speed. The vehicle speedometer 24 is connected to the transmission 17. The CPU 20 receives signals from such devices for indicating the vehicle speed at a selected time.

A laser detector 21 and a radar detector 22 are connected to the central processing unit 20 and send signals thereto when a speed-measuring device is detected as being locked onto the vehicle. At such time, the CPU 20 determines the vehicles speed and sends the data to memory 23 to be stored therein. The printer 14 can then print the vehicle speed data, as desired by an operator.

Figure 3:
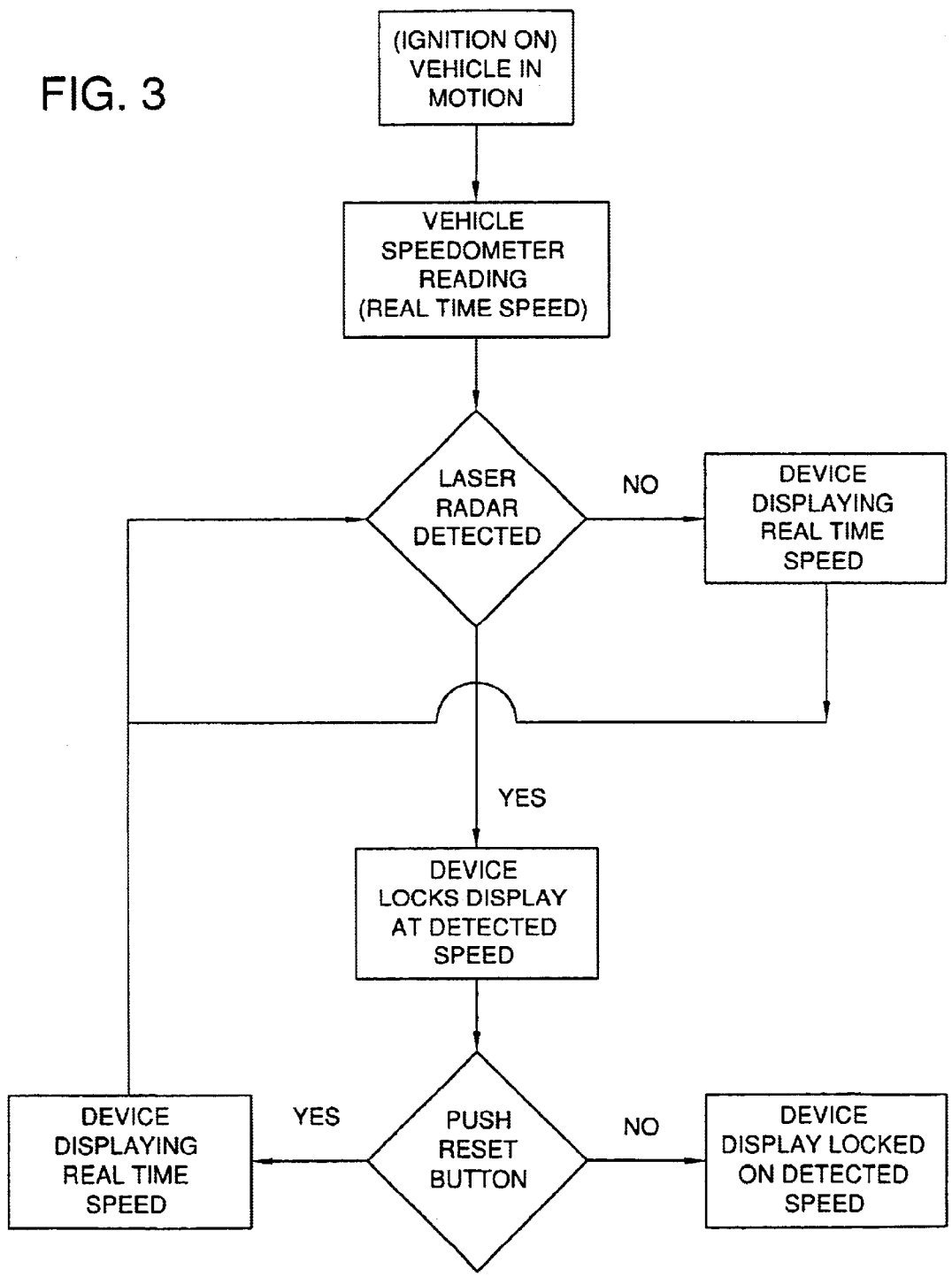
FIG. 3 is a flow diagram showing a logical operation of the preferred embodiment of the present invention.

Now referring to FIG. 3, the flow diagram illustrates the logical operation of the device 10 wherein an ignition of a vehicle is in the on position and the vehicle's odometer reading displays the real-time speed. When the detectors 21, 22, identify a laser or radar, the device 10 locks and displays the detected speed. If no laser or radar is detected, housing 11 simply displays the real-time speed of the device. To cancel or zero-out the detected speed, the reset button 13 is activated to return the device into a real-time mode for displaying the real-time speed. If the reset button 13 is not activated, the device remains locked at the detected speed.

Detectors 21, 22 may be conventional radar and laser detectors, respectively. Today, most measuring devices employed by police personnel are radar-based devices that rely upon transmission of microwaves and receipt of signals reflected off moving vehicles for facilitating calculation and display of vehicle speed. Of course, the detectors 21, 22 may also simultaneously or alternatively include means for detecting light waves of different wavelengths as well as sound waves of different frequencies, as desired. As should be understood, the printer 14 which may be contained within the housing 11 or exterior thereof (as shown) and may have a role of paper which may be advanced, in a manner well-known to those killed in the art. To facilitate printing and subsequent dispensing, a permanent record is made of the vehicle speed at the instance when the detectors 21, 22 detect that police personnel are measuring the vehicle speed.

The central processing unit 20 with memory 23 is preprogrammed to receive signals from the detectors 21, 22 and establish, thereafter, speed data that is, detected from the vehicle transmission and speedometer 17, 24, respectively. Concurrently, data indicative of the users vehicle speed is transmitted to the LCD display 12 via electrical conductors.

In operation, unwarranted speeding tickets may be avoided. For example, when an apprehending officer stops a user's vehicle, after showing the driver's license, registration and proof of insurance, the police officer will normally explain to the vehicle owner that he/she was allegedly caught speeding. At this point, the user can activate the display 12 to verify the actual measured vehicle speed in miles per hour, as well as other information including the date and time of measurement, for example. If such a speed is the same as the speed that was concurrently measured by the police officer, the speeding ticket is valid and should be paid.

If the two speeds differ, especially in the driver's favor, the driver may provide a permanent record including all display information by activating the printer 14 to cause a permanent record to be printed, preferably in duplicate. One copy may be handed to the officer with another copy retained by the driver for use as evidence in Court. Faced with such evidence, the officer may agree not to issue the citation. Otherwise, the driver may appear in Court and use the permanent record as evidence of innocence or, at minimum, of reasonable doubt as to guilt.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A vehicle speed verification device mountable within a vehicle and comprising:

a housing including a display screen for illustrating a vehicle speed, said housing being electrically connected to a vehicle transmission and a vehicle speedometer, said display screen including a LED meter and a speedometer needle cooperating with said LED meter for indicating a vehicle speed;

a power supply source connected to said housing and for selectively supplying power thereto;

means for detecting when a speed measuring device locks onto a vehicle; and means for concurrently determining a vehicle speed by automatically interrupting a speedometer drive cable of a vehicle for locking an indicator associated therewith and displaying same when said detecting means identifies a lock on a vehicle.

2. The device of claim 1, wherein said vehicle speed determining means comprises a central processing unit and a memory unit connected thereto, said central processing unit sending signals to said memory unit for storing a vehicle speed thereat.

3. The device of claim 2, further comprising means for printing the speed of a vehicle and being connected to said central processing unit, said printing means comprising data means for printing time, date, month and year of speed verification.

4. The device of claim 1, wherein said detecting means comprises a laser detector.

5. The device of claim 1, wherein said detecting means comprises a radar detector.

6. The device of claim 1, wherein said display screen comprises an LCD display.

7. A vehicle speed verification device mountable within a vehicle and comprising:

a housing including a display screen for illustrating a vehicle speed, said housing being electrically connected to a vehicle transmission and a vehicle speedometer, said display screen including a LED meter and a speedometer needle cooperating with said LED meter for indicating a vehicle speed;

a power supply source connected to said housing and for selectively supplying power thereto;

means for detecting when a speed measuring device locks onto a vehicle; and means for concurrently determining a vehicle speed by automatically interrupting a speedometer drive cable of a vehicle for locking an indicator associated therewith and displaying same when said detecting means identifies a lock on a vehicle, said determining means comprising a central processing unit and a memory unit connected thereto, said central processing unit sending signals to said memory unit for storing a vehicle speed thereat.

8. The device of claim 7, further comprising means for printing the speed of a vehicle and being connected to said central processing unit, said printing means comprising data means for printing time, date, month and year of speed verification.

9. The device of claim 7, wherein said detecting means comprises a laser detector.

10. The device of claim 7, wherein said detecting means comprises a radar detector.

11. The device of claim 7, wherein said display screen comprises an LCD display.

12. A vehicle speed verification device mountable within a vehicle and comprising:

a housing including a display screen for illustrating a vehicle speed, said housing being electrically connected to a vehicle transmission and a vehicle speedometer, said display screen including a LED meter and a speedometer needle cooperating with said LED meter for indicating a vehicle speed;

a power supply source connected to said housing and for selectively supplying power thereto;

means for detecting when a speed measuring device locks onto a vehicle;

means for concurrently determining a vehicle speed by automatically interrupting a speedometer drive cable of a vehicle for locking an indicator associated therewith and displaying same when said detecting means identifies a lock on a vehicle, said determining means comprising a central processing unit and a memory unit connected thereto, said central processing unit sending signals to said memory unit for storing a vehicle speed thereat; and means for printing the speed of a vehicle and being connected to said central processing unit, said printing means comprising data means for printing time, date, month and year of speed verification.

13. The device of claim 12, wherein said detecting means comprises a laser detector.

14. The device of claim 12, wherein said detecting means comprises a radar detector.

15. The device of claim 12, wherein said display screen comprises an LCD display.

* * * * *